(12) United States Patent
Sakamoto et al.

(10) Patent No.: US 6,224,092 B1
(45) Date of Patent: May 1, 2001

(54) AIRBAG DEVICE FOR SIDE COLLISIONS

(75) Inventors: Nobuhiko Sakamoto, Inazawa; Eiji Satou, Aichi-ken, both of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/346,890

(22) Filed: Jul. 2, 1999

(30) Foreign Application Priority Data

Jul. 2, 1998 (JP) .................................................. 10-187715

(51) Int. Cl.[7] ................................................ B60R 21/22
(52) U.S. Cl. ...................................... 280/730.2; 280/743.1
(58) Field of Search ............................. 280/730.2, 743.1, 280/728.2

(56) References Cited

U.S. PATENT DOCUMENTS

| | | | |
|---|---|---|---|
| 4,964,654 | * 10/1990 | Bishop et al. | 280/728.2 |
| 5,827,750 | * 7/1999 | Nakamura et al. | 280/730.2 |
| 5,829,779 | * 11/1998 | Nakashima et al. | 280/730.2 |
| 5,868,420 | * 2/1999 | Higashiura et al. | 280/730.2 |
| 5,899,490 | * 5/1999 | Wipasuramonton et al. | 280/730.2 |
| 5,906,390 | * 5/1999 | Phillion et al. | 280/728.3 |
| 5,906,395 | * 5/1999 | Isaji et al. | 280/743.1 |
| 6,062,594 | * 5/2000 | Asano et al. | 280/730.2 |
| 6,065,772 | * 5/2000 | Yamamoto et al. | 280/730.2 |
| 6,142,507 | * 11/2000 | Okuda et al. | 280/730.2 |

FOREIGN PATENT DOCUMENTS 9-315245    12/1997   (JP) .

* cited by examiner

*Primary Examiner*—Paul N. Dickson
(74) *Attorney, Agent, or Firm*—Pillsbury Winthrop LLP (57) ABSTRACT

An airbag device for side collisions is arranged in a back portion of a seat. The airbag device is equipped with an airbag which is mounted and fixed on its rear edge side on a seat frame. The airbag includes a lower chamber for an upstream portion of an inflating gas, and an upper chamber arranged over the lower chamber. The airbag is folded by folding the upper chamber side inwards to the lower chamber or towards the outside of a vehicle, and by bringing the front edge side toward the rear edge side. Moreover, the airbag is folded backwards or forwards at its upper side portion. The airbag in this state is mounted and fixed on the seat frame so that it is arranged in the back portion of the seat. Even if the arranged position or the like of the airbag with respect to the back portion of the seat is changed, according to the side collision airbag device of the invention, the extended area of the airbag before the completion of inflation can be easily arranged in position, not by changing the airbag but by folding the upper side of the airbag backwards or forwards.

7 Claims, 11 Drawing Sheets

AIRBAG DEVICE FOR SIDE COLLISIONS

BACKGROUND OF THE INVENTION

1. Field of the Invention

The present invention relates to an airbag device for side collisions arranged in a seat of a vehicle. This side collision airbag device arranges an inflated airbag, when activated, between the interior wall and the passenger.

2. Description of the Related Art

In the side collision airbag device of the prior art, as disclosed in Unexamined Published Japanese Patent Application No. 9-315245, the airbag is folded and arranged on an upper side in the back portion of a seat.

This airbag takes, when inflated, a substantially rectangular shape. This airbag is mounted and fixed at a plurality of vertical portions on its rear edge side on a seat frame. Further, the airbag includes a lower chamber and an upper chamber. The lower chamber provides an upstream side portion for an inflating gas. The upper chamber is arranged over the lower chamber.

For assembling the airbag with the seat, moreover, the upper chamber side of the airbag is folded at first inward towards the lower chamber. Next, the airbag is folded in a rolling manner so as to bring the front edge sides of the upper and lower chambers toward the rear edge side. After this, the airbag is mounted and fixed on the seat frame and arranged in the back portion of the seat.

An inflator for inflating the airbag is arranged in the lower chamber of the airbag on the side of the rear edge.

In the side collision airbag device of the prior art, however, the process for folding the airbag is limited to only folding the upper chamber inside towards the lower chamber, and then to folding the front edge side of the airbag on the side of the rear edge. At the acting time of the inflator, therefore, the airbag is extended and inflated in a predetermined pattern in accordance with the output of the inflator. In this pattern, the airbag is protruded forward while eliminating the fold, and the upper chamber is protruded upward from the lower chamber.

For a predetermined time period after the action of the inflator and before the completion of inflation, more specifically, the extended and inflated shape of the airbag is fixed. In other words, an area capable of restricting the passenger with the airbag is fixed for a predetermined time period before the completion of inflation after the action of the inflator.

When the arranged position of the airbag, the output of the inflator, the size and shape of the back portion of the seat are changed, therefore, it becomes necessary to change the shape of the airbag, because the extended area of the airbag capable of restricting the passenger before the end of inflation is arranged at a predetermined position.

SUMMARY OF THE INVENTION

The invention has as its object to provide an airbag device for a side collision which can easily be arranged to have an extended area of the airbag before the end of inflation be placed in a predetermined position, without changing the airbag, even if the arranged position of the airbag with respect to the back portion of a seat is changed.

The airbag device comprises an airbag, mounted and fixed on the side of its rear edge on to a seat frame, for being extended and inflated by an inflating gas when fed. The airbag includes a lower chamber of an upstream side portion for the inflating gas, and an upper chamber arranged over the lower chamber. Moreover, the airbag is mounted and fixed on the seat frame such that it is folded on the side of the upper chamber inward towards the lower chamber, or outward of a vehicle, and then such that the front edge side is brought toward the rear edge side, and an upper side portion of the air bag is folded back longitudinally.

In the side collision airbag device according to the invention, the airbag is folded such that the upper chamber portion is folded inwardly towards the lower chamber, or outwards of the vehicle, to bring the front edge side toward the rear edge side, and such that the upper side portion is then folded forwards or backwards; the airbag is mounted and fixed on the seat frame so that it is arranged in the back portion of the seat.

In short, in the side collision airbag device according to the invention, the upper side of the airbag is folded forwards or backwards at the final step of the process for folding the airbag.

When the upper side portion is folded forwards, for example, the airbag is liable to protrude forward at the initial stage of the extending and inflating time when the inflator is activated. When the forward folded length of the upper side portion is longer, moreover, the forward protruded area of the airbag can be enlarged at the initial stage of the extending and inflating time.

When the upper side portion is folded backwards, on the other hand, the airbag is liable to protrude upward at the initial stage of the extending and inflating time when the inflator is activated. When the backward folded length of the upper side portion is longer, moreover, the upward protruded area of the airbag can be enlarged at the initial stage of the extending and inflating time.

In other words, when the upper side portion is folded forwards or backwards at the final stage of the process for folding the airbag, and when the folded length of the upper side portion of the airbag is adjusted, the extended area of the airbag before the end of inflation of the inflator can be easily set without changing the airbag or the inflator.

In the side collision airbag device according to the invention, therefore, the airbag need not be changed even if the arranged position of the airbag with respect to the back portion of the seat is changed, because the forward or backward folded length of the upper side portion at the final step of the airbag folding process is adjusted, and enabling that the extended area of the airbag is easily secured after the action of the inflator and before the end of inflation to be easily arranged in a predetermined position.

Moreover, the side collision airbag device according to the invention may be constructed to include the following additional components: a diffuser can, bolts and a cover. The diffuser can is arranged on the rear edge side of the folded airbag, and is opened on its front side to cover the rear edge side of the airbag. The bolts are protruded through the diffuser can to mount the airbag on the seat frame. The cover is made of tearable and flexible material so as to cover the folded airbag. The cover is retained at its one end side by the bolts between the rear edge of the folded airbag and the diffuser can. On the other hand, the cover is wound at its intermediate portion on the folded airbag to cover the front edge side of the airbag. Moreover, the cover is retained at its other end side to cover the rear edge side of the diffuser can by the bolts protruded from the diffuser can. And, the cover covers the airbag together with the diffuser can.

In the side collision airbag device thus constructed, the airbag can be prevented by the cover from unfolding until it is mounted on the seat frame. Especially, the airbag is folded forwards or backwards at its upper side portion. As a result, the airbag is liable to be unfolded. However, the cover can effectively prevent such a destructive unfolding of the airbag.

In this side collision airbag device, the airbag and the diffuser can are integrally assembled by making use of the cover. This makes prevent the airbag and the diffuser can separating each other without fixing. This also makes it convenient to transport the airbag device through to the time until it is mounted on the seat frame.

When a label describing handling instructions or the like is to be adhered, moreover, such can be adhered to a portion of only the cover covering the diffuser can. When the label is adhered to this portion, it can be attached and held without any wrinkling. This makes it possible for a user to confirm the handling instructions or the like accurately by viewing the label during the handling or the like, up through the time until when the airbag is mounted on the seat frame. This side collision airbag device, therefore, is convenient to read is that its handling instructions or the like can be read clearly and accurately.

In this side collision airbag device, still moreover, the entire surface of the diffuser can is not covered with the cover. In this side collision airbag device, therefore, a mark for discriminating the right and left of a part, for example, can be displayed on the portion of the diffuser can that is not covered by the cover.

DESCRIPTION OF THE PREFERRED EMBODIMENTS

The invention will be described in connection with its embodiments with reference to the accompanying drawings. Here, the invention should not be limited to the embodiments. All the modifications in the requisites of Claims, or the equivalents to the requisites, should be considered as contained in the scope of Claims.

Figure 1:
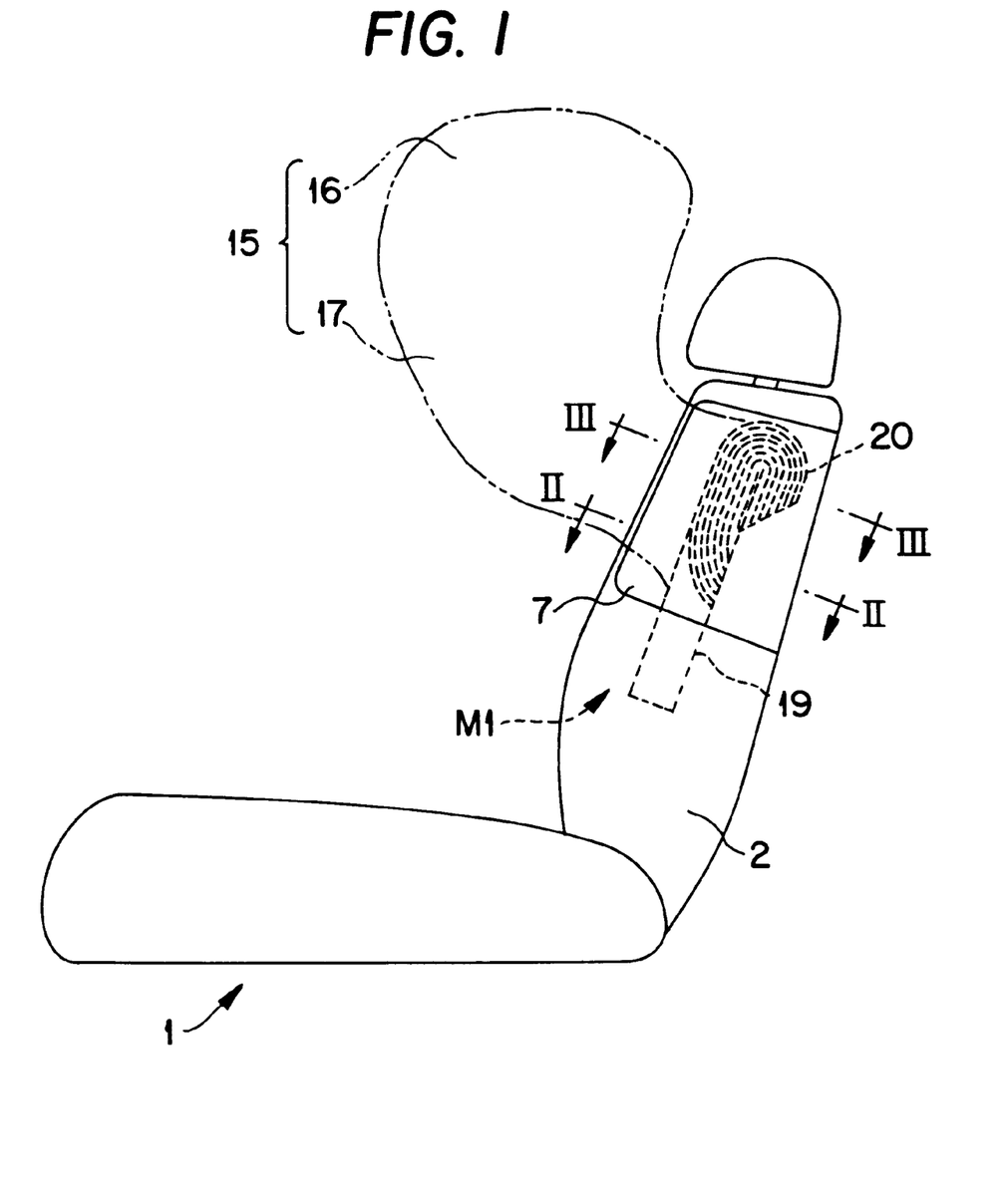
FIG. 1 is a side elevation of a seat for showing a mode of using an airbag device of one embodiment of the invention.
Figure 2:
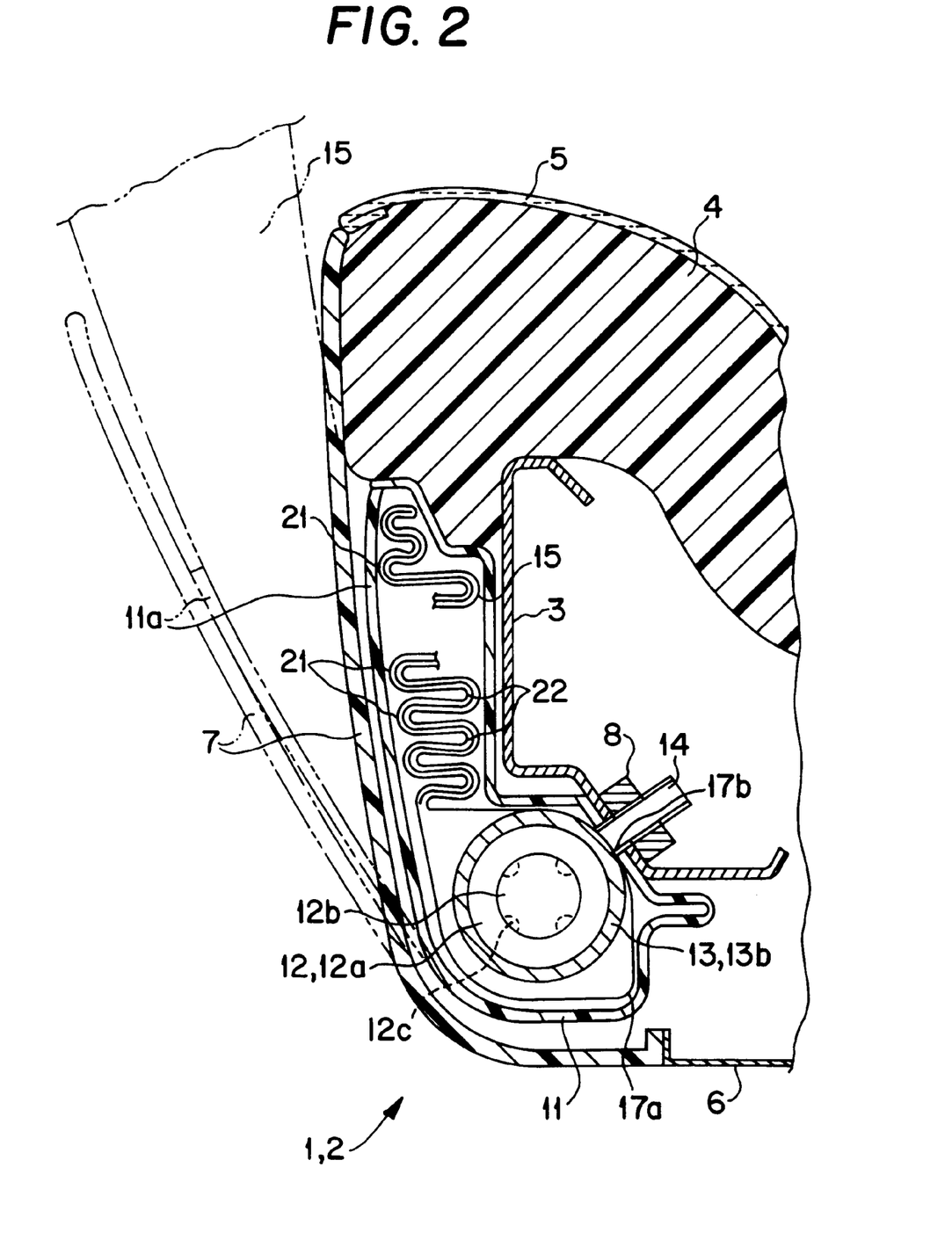
FIG. 2 is a schematic section of a portion II—II of FIG. 1.
Figure 3:
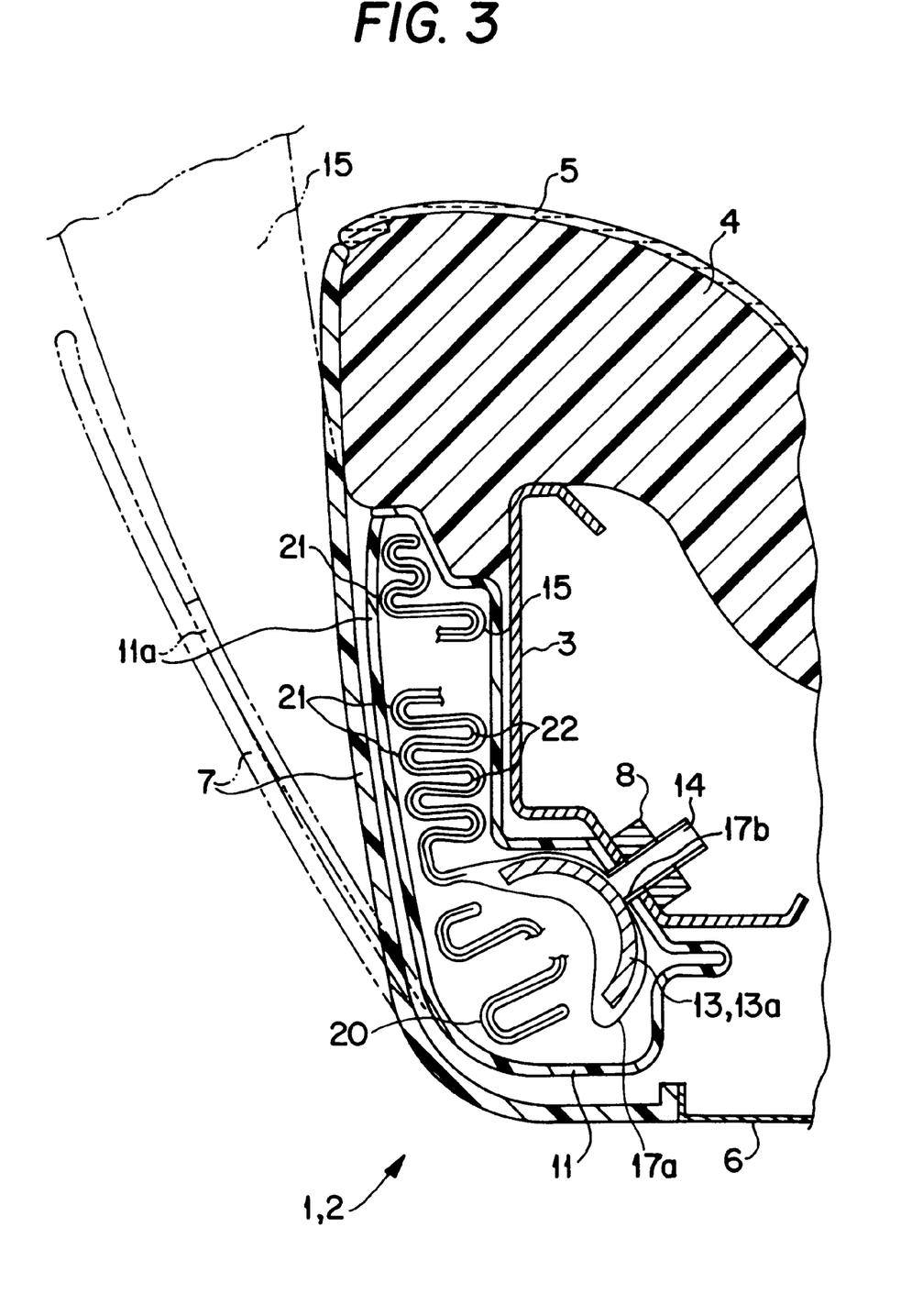
FIG. 3 is a schematic section of a portion III—III of FIG. 1.

An embodiment of an airbag device M1 for a side collision is arranged in an outer side upper portion of a back portion of a vehicular seat 1, as shown in FIGS. 1 to 3.

In the back portion 2, there is provided a seat frame 3 which is arranged substantially vertically. The side collision airbag device M1 is fixed on the frame 3 by nuts 8 on bolts 14 of a retainer 13. Here, reference numeral 4 designates a cushion, and numerals 5 and 6 designate outer covers made of fabric. Moreover, numeral 7 designates a cover to be opened at the time of extending and inflating an airbag 15. This cover 7 is attached to the portion of the back portion 2 on the vehicular outer side. The side collision airbag device M1 includes the airbag 15, a case 11, an inflator 12, and the retainer 13. The case 11 covers the airbag 15, as folded. The inflator 12 feeds the airbag 15 with an inflating gas.

The case 11 is made of a synthetic resin such as olefin thermoplastic elastomer. The case 11 includes a door portion 11a to be opened at the time of inflating the airbag 15. The door portion 11a covers the airbag 15 and the inflator 12.

Figure 5:
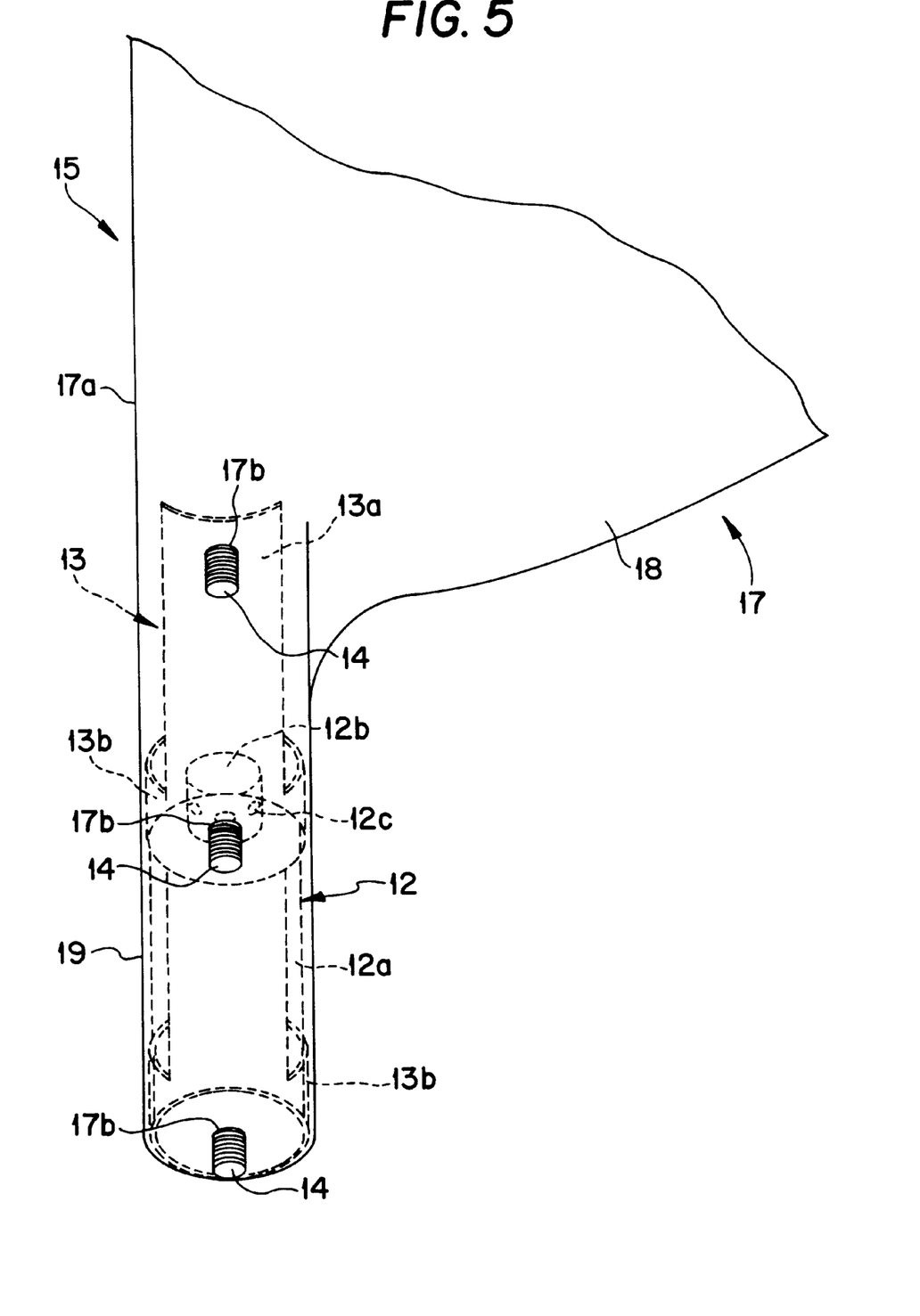
FIG. 5 is a perspective view showing the vicinity of an assembly of an airbag and an inflator to be used in the embodiment.

The inflator 12 is of a round cylindrical type, as shown in FIGS. 2, 3 and 5. The inflator 12 is arranged in a later-described cylindrical portion 19 of the airbag 15. The inflator 12 includes a round column-shaped body portion 12a, and a round column-shaped diametrically smaller portion 12b arranged over the body portion 12a. The smaller portion 12b is provided on its circumference with a plurality of gas discharge ports 12c for discharging the inflating gas.

Figure 4:
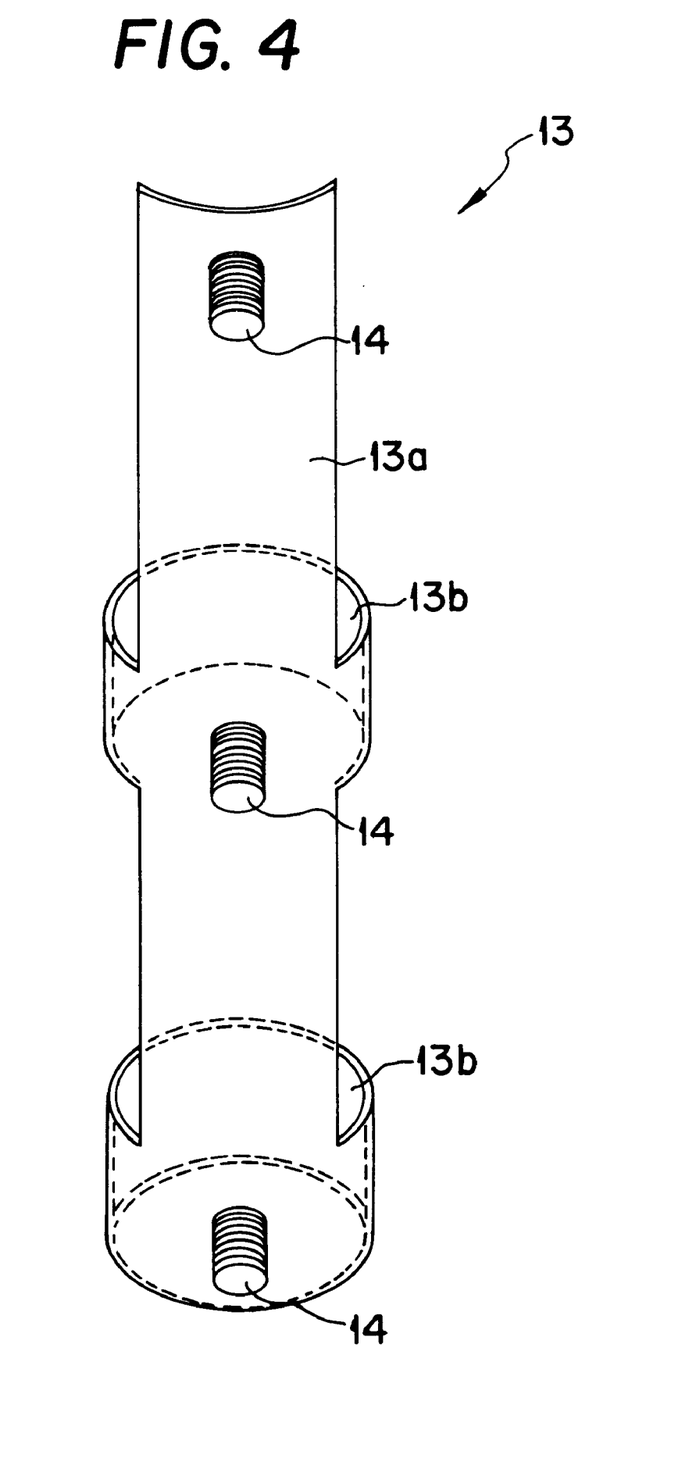
FIG. 4 is a perspective view of a retainer to be used in the embodiment.

The retainer 13 is made of a sheet metal, as shown in FIGS. 4 and 5, to include a body portion 13a and two ring portions 13b in the present embodiment. The body portion 13a is vertically extended in a cylindrical shape having substantially halved sections. The ring portions 13b are annularly extended from the body portion 13a. Both ring portions 13b retain the inflator 12. For this retention, both ring portions 13b are mounted on first around the round column-shaped inflator body portion 12a. Next, both ring portions 13b are elastically deformed and diametrically reduced so as to abut against the body portion 12a, so as to depress the body portion 12a. As a result, both ring portions 13b retain the inflator 12. On the other hand, the retainer 13 has a total of three bolts 14 that are protruded from the body portion 13a. The bolts 14 are arranged at the positions of the ring portions 13b, and at a position protruded upward from the inflator 12. The ring portion 13b on the upper side is arranged to cover the gas discharge ports 12c of the inflator 12. As a result, the ring portion 13b on the upper side also performs the action of a diffuser. In other words, the ring portion 13b on the upper side guides the inflating gas, as discharged from the gas discharge ports 12c, upwards.

The side collision airbag 15 is formed into a bag shape of a substantially rectangular plate, as shown in FIGS. 1 to 3 and 5 to 7. The airbag 15 is provided with two chambers, a lower chamber 17 and an upper chamber 16. The lower chamber 17 provides an upstream side portion for the inflating gas. The upper chamber 16 is arranged over the lower chamber 17. Moreover, the lower chamber 17 includes an upper side body portion 18 and a cylindrical portion 19. This cylindrical portion 19 is formed to extend downwards of the body portion 18, on the side of a rear edge 17a of the lower chamber 17. The cylindrical portion 19 is mounted around the round inflator 12. The lower chamber 17 is provided with three mounting holes 17b on the side of the rear edge 17a from the body portion 18 to the cylindrical portion 19. The bolts 14 are inserted into those mounting holes 17b. On the lower edge side of the lower chamber 17, moreover, there is formed a teaser 15a (as shown in A of FIG. 6) which stitches the vehicular inner portion and the vehicular outer portion. This teaser 15a is provided for adjusting the thickness and volume of the airbag 15 at the inflation time.

The airbag 15 is made of a sheet of fabric folded on the side of the rear edge 17a of the lower chamber 17. Moreover, the airbag 15 is stitched, at its outer peripheral edges excepting the rear edge 17a, into a bag shape.

More specifically, the airbag 15 is manufactured in the following manner. First, the three mounting holes 17b are formed in a sheet of fabric material, as cut into a predetermined shape. After this, the fabric is folded conduplicate at the portion on the side of the rear edge 17a of the lower chamber 17. Next, the conduplicate outer peripheral edges are stitched, while leaving portions non-stitched. Then, the fabric is so turned inside out by making use of the non-stitched portions in a manner that the margins to stitch such can not be exposed to the outer surface. Moreover, the inflator 12, to which the retainer 13 is attached, is inserted from the non-stitched portions of the outer peripheral edge into the airbag 15. Moreover, the bolts 14 or not-shown lead wires, as extended from the inflator 12, are led out from predetermined holes formed in the fabric material of the airbag 15. Then, the non-stitched portions of the outer peripheral edges are stitched, and the teaser 15a is stitched so that the airbag 15 can be manufactured.

Figure 6:
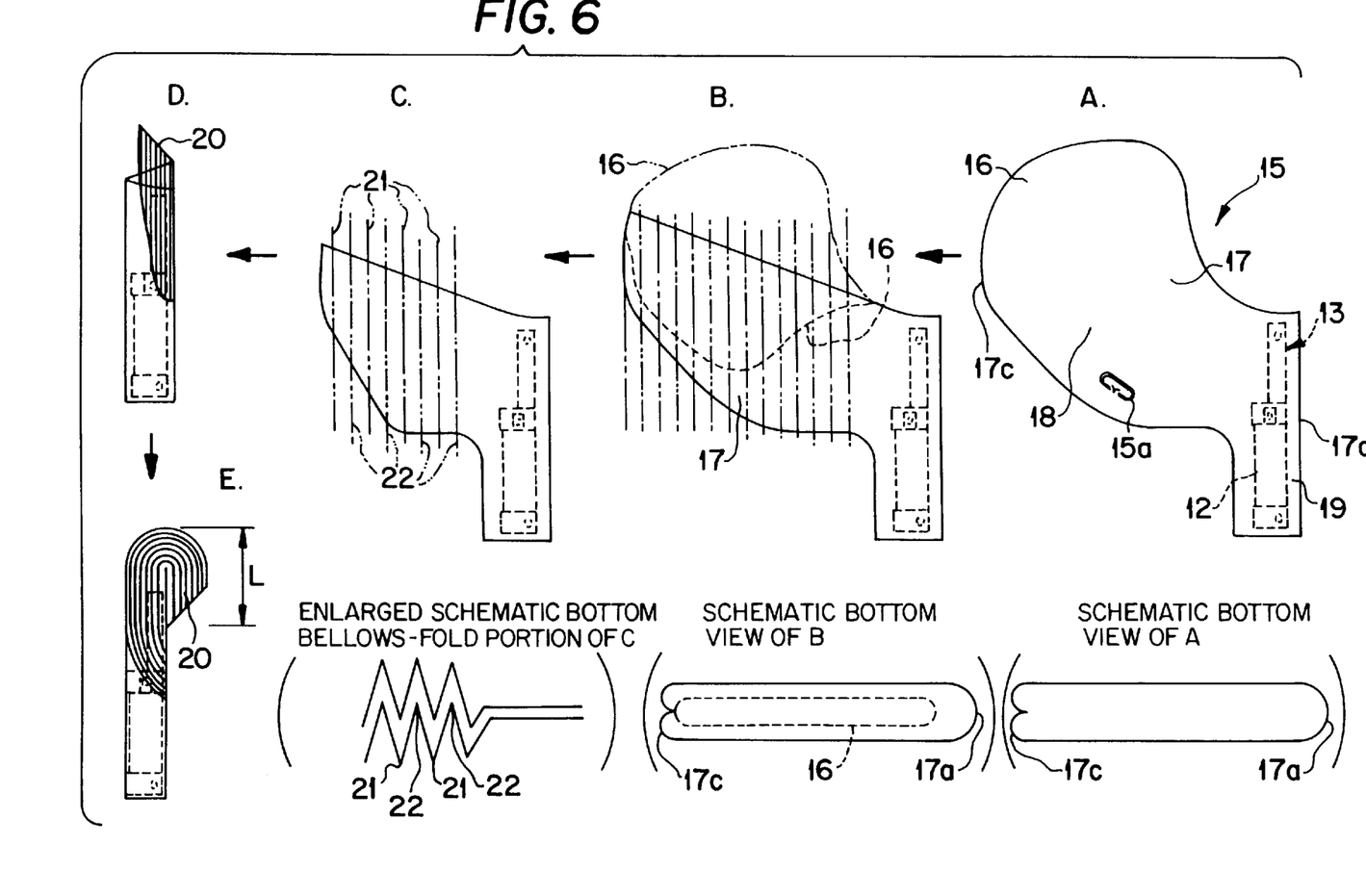
FIG. 6 is a diagram for explaining a process for folding the airbag of the embodiment.

For folding up the airbag 15 of the embodiment thus manufactured, the upper chamber 16 is folded at first from the state shown at A in FIG. 6 into the body portion 18 of the lower chamber 17, as shown at B. Next, as shown at C and D in FIG. 6, ridge and valley folds 21 and 22 are repeatedly made from the front side to the rear side into a bellows shape. As shown at D and E in FIG. 6, moreover, an upper side portion 20 of the folded airbag 15 is folded back downwards to the rear.

After the airbag 15 was folded, the airbag 15, the retainer 13 and the inflator 12 are cased in the case 11 so as to cause the individual bolts 14 to protrude. When the individual bolts 14 are fastened in the seat frame 3 by the nuts 8, the airbag device M1 can be mounted in the back portion 2 of the seat 1.

Here, the seat 1 is completely assembled by attaching the outer covers 5 and 6 and the cover 7 after the airbag device M1 was mounted. After this, the assembled seat 1 is mounted on the vehicle. When the seat 1 is mounted on the vehicle, the lead wires, as led from the inflator 12, are connected with a predetermined airbag activating circuit of the vehicle.

When a predetermined signal is inputted to the inflator 12 after the airbag device M1 has been mounted on the vehicle, an inflating gas is discharged from the gas discharge ports 12c of the inflator 12. Then, the airbag 15 is extended and inflated forwards and upwards so as to open the door portion 11a and the cover 7. Moreover, the airbag 15 is greatly inflated, as indicated by double-dotted lines in FIG. 1.

In the airbag device M1 of this embodiment, moreover, the airbag 15 is folded at first on the side of the upper chamber 16 into the lower chamber 17. Next, the airbag 15 is folded into a bellows shape to bring the side of a front edge 17c toward the side of the rear edge 17a. After this, the airbag 15 is folded backwards at its upper side portion 20. In this state, moreover, the airbag 15 is mounted and fixed on the seat frame 3, and is arranged in the back portion 2 of the seat 1.

In the side collision airbag device M1 of the embodiment, more specifically, the upper side portion 20 is folded backwards at the final step of the process for folding the airbag 15.

Figure 7:
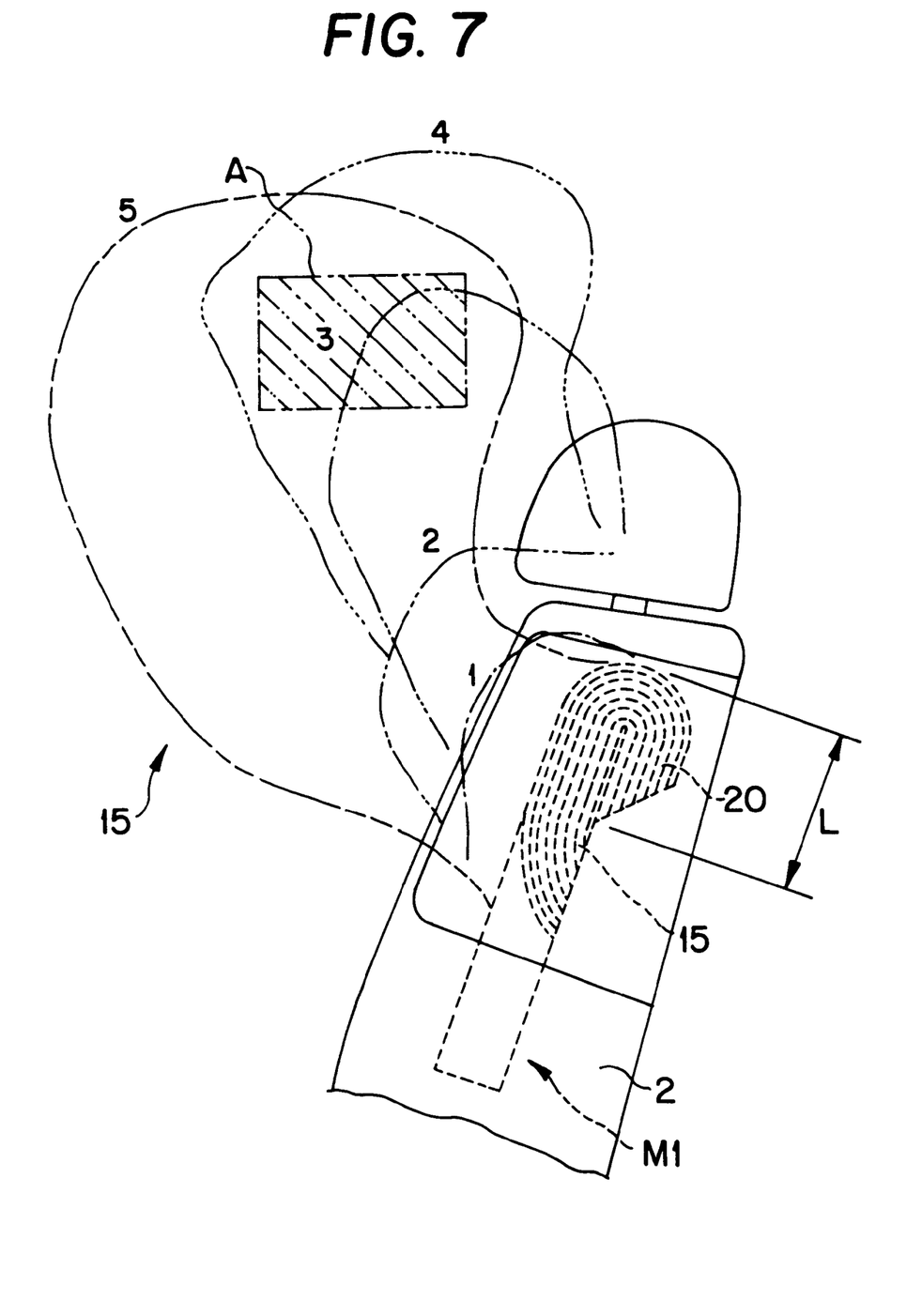
FIG. 7 is an explanatory diagram showing an extension and inflation time of the airbag of the embodiment.

In this mode, as shown in FIG. 7, the airbag 15 is liable to protrude upward, as indicated by a sequence of ① to ④, at an initial stage of the extending and inflating time. Moreover, the airbag 15 can be arranged such that an extended area A at a high position as restrict the passenger before the inflation ends. Here, state ⑤ of FIG. 7 indicates the end point of the inflation of the airbag 15.

Moreover, if the folded-back length L (refer to E in FIG. 6 and in FIG. 7) of the upper side portion 20 is enlarged, that is, if the upper side portion 20 is deeply folded back, the airbag 15 can enable a greater enlargement of the upward protruded area at the initial stage of the extending and inflating time. As a result, the airbag 15 can cause the extended area A (the area which restricts the passenger before the end of inflation) to be arranged at a higher position.

Figure 8:
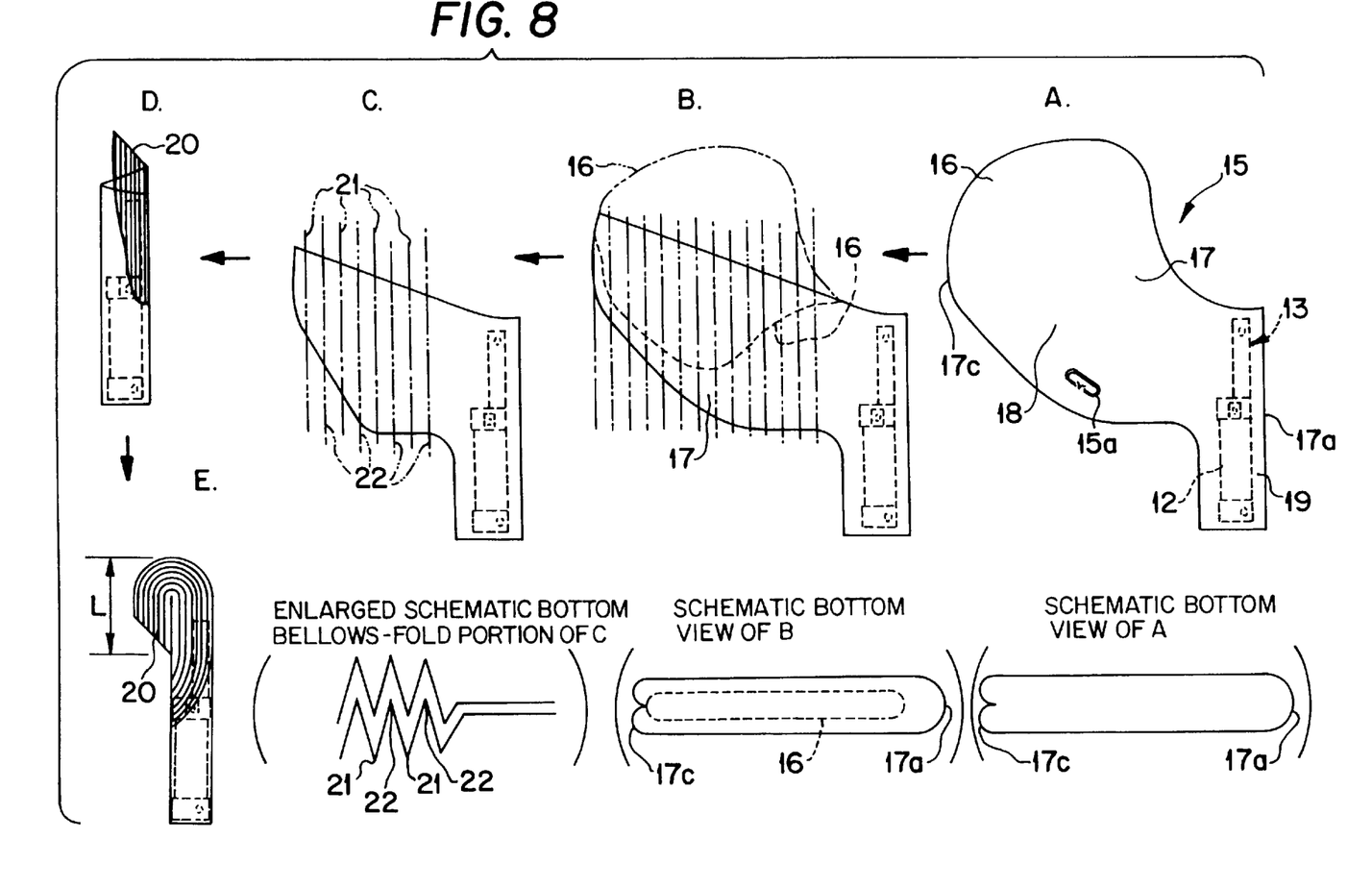
FIG. 8 is a diagram for explaining another process for folding the airbag of the embodiment.
Figure 9:
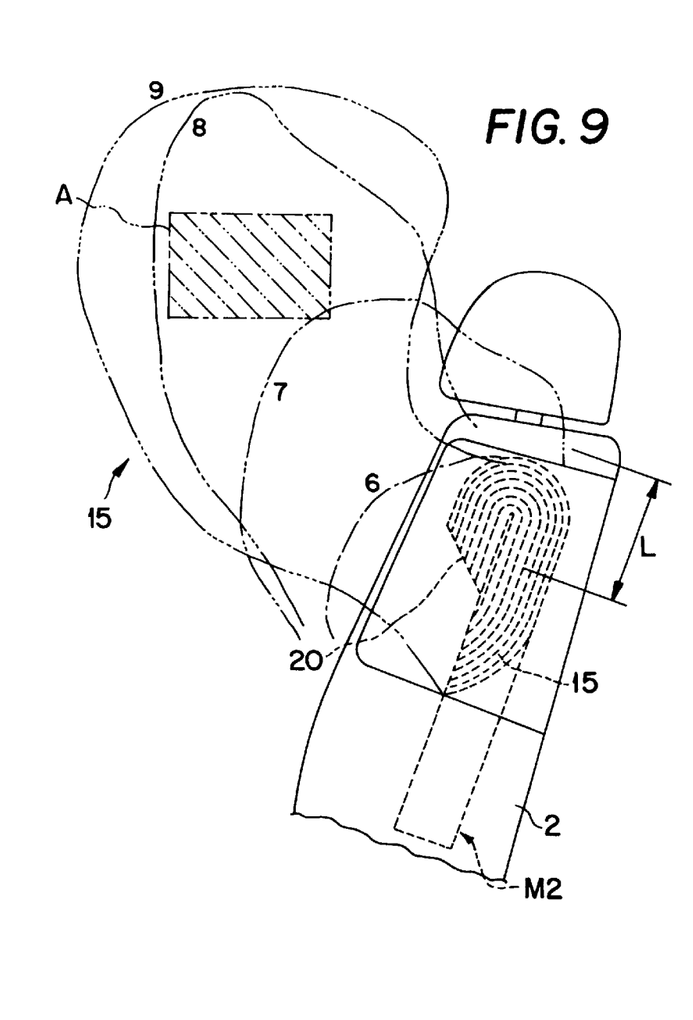
FIG. 9 is an explanatory diagram showing an extension and inflation time of an airbag that is folded by the folding process shown in FIG. 8.

As shown in the final step E of FIG. 8, the upper side portion 20 of the airbag 15 is folded forward. The airbag 15 is folded and is then mounted, as in the airbag device M1, to the seat frame 3 by making use of the nuts 8, as shown in FIG. 9. In this side collision airbag device M2, as shown in FIG. 9, the airbag 15 becomes liable to protrude forward in the sequence of ⑥ to ⑧ at the initial stage of the extending and inflating time when the inflator 12 acts. In the airbag 15 of this airbag device M2, therefore, the extended area A capable of restricting the passenger before the end of inflation can be arranged to be in a forward location. Here, the state ⑨ of FIG. 9 indicates the end of inflation of the airbag 15.

If the forward folded length L of the upper side portion 20 is enlarged, still moreover, the forward protruded area at the initial stage of the extending and inflating time can be enlarged even more. As a result, the airbag 15 can be arrange such that the extended area A, restricts the passenger before the end of inflation, is further forward.

At the final step of the process for folding the airbag 15, therefore, the upper side portion 20 is folded backwards or forwards, as individually indicated at E in FIGS. 6 and 8. Still moreover, the folded length L of the upper side portion 20 is adjusted. If the airbag 15 is thus folded, its extended area A before the end of inflation and after the activation of the inflator 12 can be arbitrarily set, without changing the airbag or the inflator.

In the side collision airbag devices M1 and M2 of the embodiment, therefore, even if there are changed the arranged position of the airbag 15 is changed with respect to the back portion 2 of the seat 1, the output of the inflator 12, the size and shape of the back portion 2 of the seat 1 and so on, the airbag 15 may be folded at the final step E of its folding process by folding the upper side portion 20 backwards, or forwards, and by adjusting the folded length L. With this adjustment, the extended area A of the airbag 15 before the end of inflation and after the activation of the inflator 12 can be easily arranged at a predetermined position, without any changes in the airbag 15 or the inflator 12. As a result, the degree of freedom for arranging the airbag 15 can be improved in the side collision airbag devices M1 and M2 of the embodiment.

Here in the airbag devices M1 and M2, the upper chamber 16 is folded inside of the body portion 18 of the lower chamber 17, as shown in FIGS. 6 and 8, in the states A and B at the initial stage of the folding process. However, the upper chamber 16 may be folded not only inside of the lower chamber 17, but also on the vehicular outer side of the lower chamber 17 (or folded inside out). In the states C and D at the initial stage of the folding process of FIGS. 6 and 8, moreover, the airbag 15 is folded from the front side to the rear side into a bellows shape. As disclosed in Unexamined Published Japanese Patent Application No. 9-31245, however, the airbag 15 may be rolled from the front side to the back side.

In the side collision airbag devices M1 and M2 of the embodiment, even if the upper side portion 20 of the airbag 15 is folded back, the inflator 12 is not arranged at the folded-back position. Thus, the side collision airbag devices M1 and M2 of the embodiment do not become excessively bulky. As a result, the side collision airbag devices M1 and M2 of the embodiment can be easily arranged in the narrow space or in the upper portion of the back portion 2.

Moreover, the airbag 15 of the embodiment is stably mounted and fixed on the seat frame 3 at a plurality of (or three in the present embodiment) vertically long portions on the side of the rear edge 17a by making use of the bolts 14 of the retainer 13. Thus, the airbag 15 is stably supported by the seat frame 3, even if the upper side portion 20 is folded back. As a result, the airbag 15 is stably inflated.

In the embodiment, still moreover, the body portion 13a of the retainer 13 is formed into a generally halved cylindrical shape. In other words, the body portion 13a is made to have a high bending rigidity in the longitudinal direction. As a result, the mounting strength of the bolts 14 can be enhanced to firmly support the lower chamber 17 of the airbag 15.

Moreover, the body portion 13a of the retainer 13 is formed into a generally halved cylindrical shape. At the time of inflating the airbag 15, therefore, the side of the rear edge 17a of the lower chamber 17 can be supported on the arcuate face of the body portion 13a. As a result, it is possible to prevent the airbag 15 from being damaged by the body portion 13a.

In the side collision airbag devices M1 and M2, the folded airbag 15 is covered with the case 11 made of a synthetic resin. In a side collision airbag device M3 shown in FIGS. 10 to 12, however, the folded airbag 15 may be covered with a cover 41. The cover 41 is made of tearable and flexible unwoven fabric.

Figure 10:
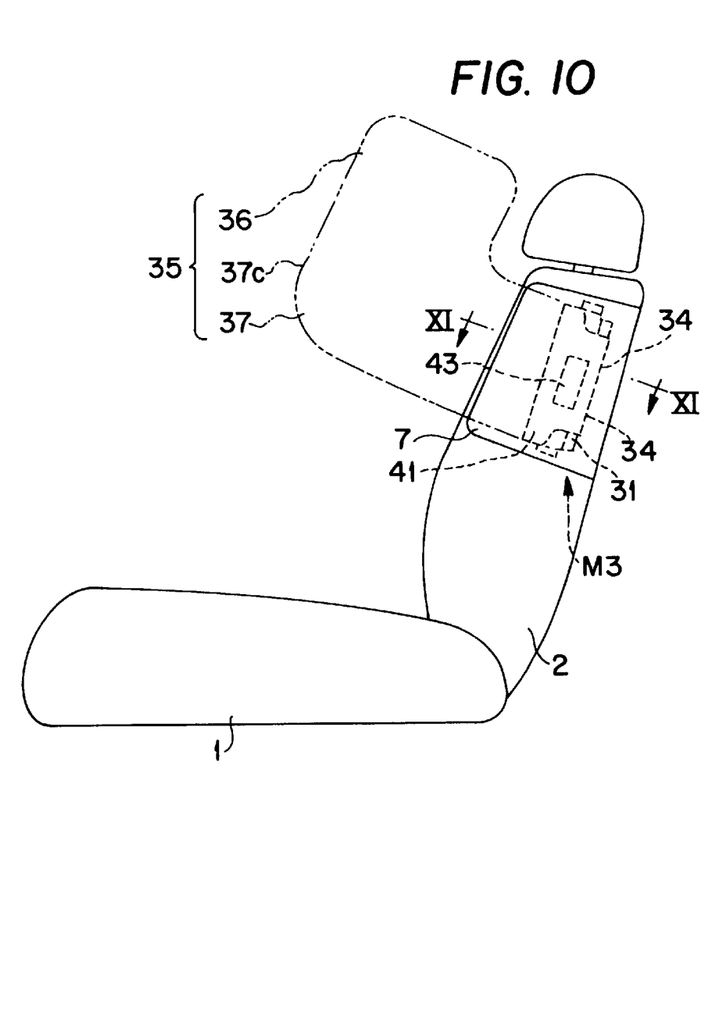
FIG. 10 is a side elevation of a seat for showing a mode of using an airbag device of another embodiment.
Figure 11:
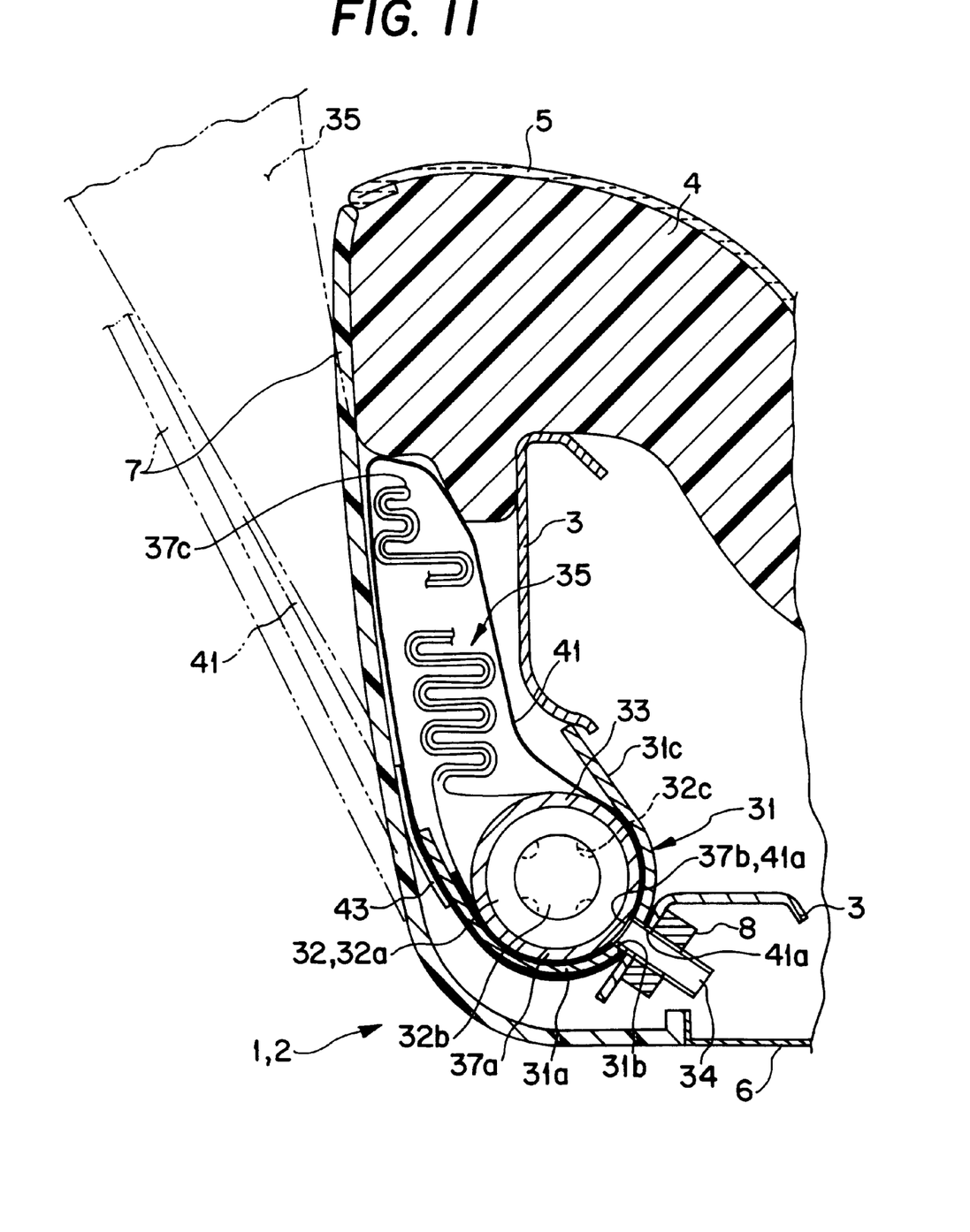
FIG. 11 is a schematic section of a portion XI—XI of FIG. 10.
Figure 12:
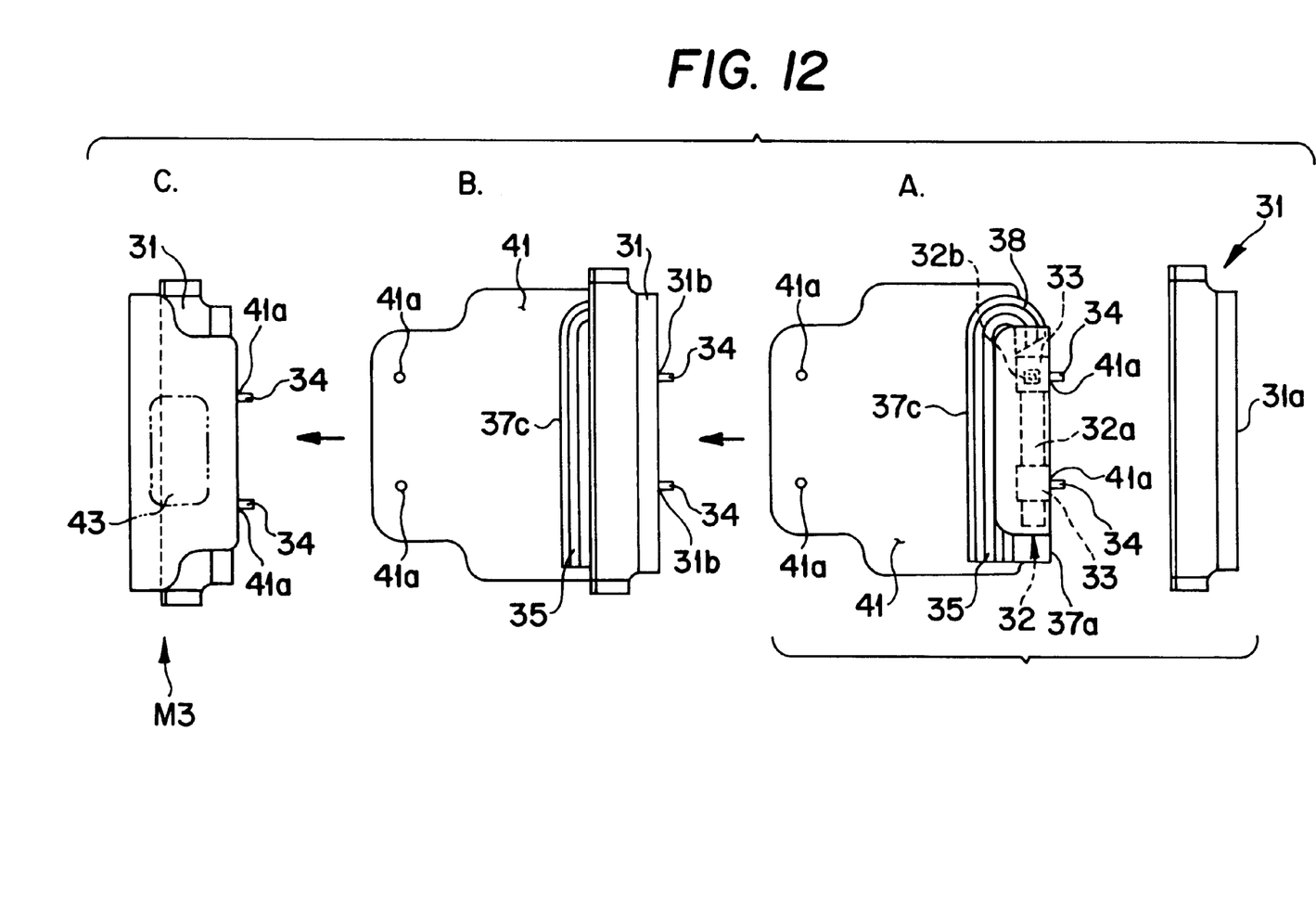
FIG. 12 is an explanatory diagram showing a process for winding the cover of the embodiment.

This side collision airbag device M3 is constructed to include an airbag 35, a cover 41, a diffuser can 31, an inflator 32, and mounting brackets 33. The cover 41 covers the airbag 35, as folded. The diffusion can 31 covers the folded airbag 35 on the side of a rear edge 37a. The inflator 32 feeds the airbag 35 with the inflating gas. The mounting brackets 33 have bolts 34 fixed thereon.

The airbag 35 is provided with two chambers, a lower chamber 37, and an upper chamber 36, and is formed into a substantially rectangular plate-like bag shape. The lower chamber 37 is an upstream portion for the inflating gas. The upper chamber 36 is arranged over the lower chamber 37. The lower chamber 37 is provided with two mounting holes 37b, over and below the side of the rear edge 37a. Into these mounting holes 37b, there are inserted the bolts 34, which are extended from the mounting brackets 33.

The diffuser can 31 is made of a sheet metal, and is formed into a substantially rectangular square shape that is opened forwards. The diffuser can 31 covers the folded airbag 35 on the side of the rear edge 37a. The diffuser can 31 is provided in its bottom wall 31a with two upper and lower through holes 31b. Into these through holes 31b, there are individually inserted the bolts 34 of the mounting brackets 33. This diffuser can 31 regulates the backward discharge of the inflating gas when this gas is discharged from the inflator 32. Moreover, the diffuser can 31 facilitates the forward protrusion of the later-described lower chamber 37 of the airbag 35.

The inflator 32 is formed as a round cylindrical type, as shown in FIGS. 11 and 12, and is constructed to include a round column-shaped body portion 32a and a diametrically smaller portion 32b. This diametrically smaller portion 32b is formed into a round column shape, and is arranged over the body portion 32a. The diametrically smaller portion 32b is provided in its circumference with a plurality of gas discharge ports 32c for discharging the inflating gas therethrough.

The mounting brackets 33 are made of a sheet metal, as shown in FIGS. 11 and 12, and includes annular body portions 33a and the bolts 34. These bolts 34 are fixed in the body portion 33a. Each mounting bracket 33 is first mounted around the round column-shaped inflator body portion 32a. Then, the body portion 33a is elastically deformed and diametrically reduced to depress the body portion 32a. Then, the body portions 33a can be assembled with the inflator 32.

The cover 41 is provided at the right and left ends of its extended state with two respective upper and lower through holes 41a. The bolts 34 are inserted into the through holes 41a.

For folding the airbag 35 of this airbag device M3, the upper chamber 36 is first folded inside into the lower chamber 37. Then, the airbag 35 is folded into a bellows shape by repeating ridge and valley folds from the front to the back, so as to bring the side of a front edge 37c toward the side of the rear edge 37a. Moreover, the folded airbag 35 is folded backwards to fold back its upper side portion 38 (as shown in A of FIG. 12) further downwards.

Before the airbag 35 is folded, the inflator 32, as assembled in advance with the mounting brackets 33 and 33, is arranged in the lower chamber 37 of the airbag 35 on the side of the rear edge 37a. Meanwhile, the bolts 34 are protruded from the mounting holes 37b.

After the airbag 35 has been folded, moreover, each bolt 34 is inserted into each through hole 41a on the side of one end portion of the cover 41, so as to protrude therefrom, as shown at A in FIG. 12. Next, the folded airbag 35 is covered on the side of its rear edge 37a with the diffuser can 31, so as to cause each bolt 34 to protrude from each through hole 31b, as shown at B in FIG. 12. As shown at C in FIG. 12, moreover, the cover 41 is wound at its transversely intermediate portion on the airbag 35 so as to cover the folded airbag 35 on the side of the front edge 37c. Moreover, the diffuser can 31 is covered on its rear edge side with the other end side of the cover 41. Still moreover, the bolts 34 and 34, as protruded from the diffuser can 31, are individually inserted into the through holes 41a on the other end side of the cover 41. When the other end side of the cover 41 is fastened by the bolts 34, the airbag device M3 can be thus fully assembled.

In the embodiment, still moreover, a caution label 43 is adhered on the surface nearly the cover 41 covering the diffuser can 31. Thus, the assembly of the airbag device M3 can be completed. On the caution label 43, there is described precautions/procedures for handling the airbag device M3.

After this, the bolts 34 are fixed on the seat frame 3 by making use of the nuts 8. Then, the airbag device M3 can be assembled with the back portion 2 of seat 1. Naturally, the assembly of this seat 1 is completed by mounting the airbag device M3, and then by attaching the outer covers 5 and 6, the cover 7 and so on. After this, the assembled seat 1 is mounted on the vehicle. When the seat 1 is to be mounted on the vehicle, the lead wires, as led from the inflator 32, are connected with the predetermined airbag activating circuit of the vehicle.

When the predetermined signal is inputted to the inflator 32 after the airbag device M3 has been mounted on the vehicle, the inflating gas is discharged from the gas discharge ports 32c of the inflator 32. Then, the airbag 35 is extended and inflated forwards and upwards so as to break the cover 41. Moreover, the airbag 35 opens the cover 7. Then, the airbag 35 is largely inflated, as indicated by double-dotted lines in FIG. 10.

This airbag device M3 can achieve actions and effects similar to those of the airbag device M1. Moreover, the airbag device M3 can achieve the following additional actions and effects.

Specifically, the folded airbag 35 of the airbag device M3 is covered with the cover 41. As a result, the airbag 35 can be prevented from unfolding until it is mounted on the seat frame 3. Especially in the present embodiment, the upper side portion 38 of the folded airbag 35 is folded on the back side or the like. This makes it liable for the airbag 35 of the embodiment to be unfolded. However, such a destructive unfolding of the airbag 35 can be effectively prevented by the cover 41.

In the present embodiment, the airbag 35 and the diffuser can 31 are wound and integrally assembled together by the cover 41. This makes prevent the airbag 35 and the diffuser can 31 separating each other without fixing. As a result, the transportation or the like of the airbag device M3 becomes convenient until the time it is mounted on the seat frame 3.

When the caution label 43 describing the handling precautions/procedures or the like is to be adhered, it can be adhered to only the portion of the cover 41 that is covering the diffuser can 31. In short, the label 43 can be adhered without any wrinkling or the like. In the embodiment, therefore, an accurate confirmation can be made of the handling precautions/procedures for mounting the airbag 35 on the seat frame 3 by viewing the label 43. In this side collision airbag device M3, therefore, the handling precautions can be accurately read for the sake of convenience.

Still moreover, the entire surface of the diffuser can 31 is not covered with the cover 41. This makes it possible to also display a mark for discriminating the right and left portions of the part, for example, the portion 31 (refer to FIG. 11) of the diffuser can 31, that is as not covered with the cover 41.

What is claimed is:

1. An airbag device on a back portion of a seat, comprising:

an airbag, mounted on a seat frame, for being extended and inflated by inflating gas;

wherein said airbag includes a lower chamber to be filled by said inflating gas, and an upper chamber arranged over said lower chamber; and wherein only said lower chamber is mounted directly onto said seat frame, said airbag being folded so that a top portion of said upper chamber is folded downwardly toward said lower chamber to create a first folded position, after which said first folded position is incrementally formed into a series of adjacent folds collapsing the first folded position towards a rear edge of said airbag to create a second folded position, and then an upper side portion of said second folded position is folded downwardly on itself.

2. An airbag device according to claim 1, wherein said upper side portion is folded towards a forward side of said lower chamber.

3. An airbag device according to claim 1, wherein said upper side portion is folded towards a back side of said lower chamber.

4. An airbag device according to claim 1, further comprising:

a cylindrical inflator, arranged adjacent to the rear edge of said air bag and below the folded downwardly upper side portion of said second folded position, to supply inflating gas into the airbag.

5. An airbag device according to claim 4, further comprising:

a retainer retaining said inflator;

said retainer being arranged in said airbag together with said inflator, and includes a generally halved cylindrical body portion arranged vertically on the side of the rear edge of said airbag, and a plurality of ring portions connected to said inflator; and bolts fixing together said airbag with said inflator on said seat frame, said bolts arranged in a plurality of vertical portions of said body portion of said retainer so as to protrude from the rear edge of said airbag.

6. An airbag device according to claim 1, further comprising:

a diffuser arranged on the rear edge of said folded airbag, said diffuser having an opening facing the rear edge of said airbag;

a plurality of bolts protruding through said diffuser to mount said airbag on said seat frame; and a cover for said folded airbag made of tearable and flexible material;

wherein said cover includes a side having a first end, a second end, and an intermediate portion located between said first and second ends:

said cover is retained at said first end of said side by said bolts between the rear edge of said folded airbag and said diffuser;

said cover is wound at its intermediate portion on said folded airbag to cover the front edge side of said airbag;

said cover is retained at said second end of said side to cover the rear edge side of said diffuser can by the bolts protruded from said diffuser; and said cover is arranged to cover said airbag together with said diffuser.

7. An airbag device according to claim 6, further comprising:

a label adhered on a surface positioned near the portion of said cover, which covers said diffuser can.

* * * * *